(12) United States Patent
Zhang et al.

(10) Patent No.: US 11,311,949 B2
(45) Date of Patent: Apr. 26, 2022

(54) INDEXABLE FACE MILLING CUTTING INSERT AND FACE MILLING CUTTING HEAD USING THE CUTTING INSERT

(71) Applicant: BEIJING WORLDIA DIAMOND TOOLS CO.,LTD., Beijing (CN)

(72) Inventors: Zongchao Zhang, Beijing (CN); Qi Han, Beijing (CN); Xiaoyan Fan, Beijing (CN)

(73) Assignee: BEIJING WORLDIA DIAMOND TOOLS CO., LTD., Bejing (CN)

( * ) Notice: Subject to any disclaimer, the term of this patent is extended or adjusted under 35 U.S.C. 154(b) by 21 days.

(21) Appl. No.: 16/462,948

(22) PCT Filed: Dec. 12, 2017

(86) PCT No.: PCT/CN2017/115596
§ 371 (c)(1),
(2) Date: May 22, 2019

(87) PCT Pub. No.: WO2019/010915
PCT Pub. Date: Jan. 17, 2019

(65) Prior Publication Data
US 2020/0122247 A1 Apr. 23, 2020

(30) Foreign Application Priority Data

Jul. 12, 2017 (CN) .......................... 201710566456.8
Jul. 12, 2017 (CN) .......................... 201710567057.3

(51) Int. Cl.
*B23C 5/06* (2006.01)
*B23C 5/22* (2006.01)

(52) U.S. Cl.
CPC .............. *B23C 5/06* (2013.01); *B23C 5/2213* (2013.01); *B23C 2200/0433* (2013.01); *B23C 2200/08* (2013.01); *B23C 2200/28* (2013.01)

(58) Field of Classification Search
CPC .... B23C 2200/0433; B23C 2200/0455; B23C 2200/08; B23C 2200/125;
(Continued)

(56) References Cited

U.S. PATENT DOCUMENTS 4,561,810 A * 12/1985 Ohno .................... B23B 27/145
407/114
5,078,550 A * 1/1992 Satran ..................... B23C 5/202
407/34
(Continued)

FOREIGN PATENT DOCUMENTS

CN         202291454 U    7/2012
CN         107199363 A    9/2017
(Continued)

OTHER PUBLICATIONS

JP-05138409-A Machine Translation, pp. 5-7. (Year: 2021).*
JP search report dated Oct. 2, 2020.

*Primary Examiner* — Nicole N Ramos
(74) *Attorney, Agent, or Firm* — Gang Yu

(57) ABSTRACT

Disclosed is an indexable face milling cutting insert which comprises an insert body and a cutting body laminated on an upper surface of the insert body, and the insert body comprises multiple positioning side surfaces, an upper plane, and a positioning bottom surface; a projection of an edge of the positioning bottom surface, or an extension line thereof, on a rake face is intersected with a corresponding edge of the rake face, or an extension line thereof, to form a surface deflection angle and multiple flank faces are arranged between the rake face and the multiple positioning side surfaces, so as to avoid damaging the positioning side surfaces when a cutting edge is sharpened, thereby ensuring stability and long-term effect of a positioning reference, and
(Continued)

a face cutting milling and a wiper face milling are applicable to a same face milling insert retaining slots.

16 Claims, 14 Drawing Sheets

(58) Field of Classification Search
CPC .......... B23C 2200/208; B23C 2200/28; B23C 2210/045; B23C 2210/0457; B23C 2226/125; B23C 2226/315; B23C 5/06; B23C 5/2213; B23C 5/2273; B23C 5/2441; B23C 5/2462
See application file for complete search history.

(56) References Cited

U.S. PATENT DOCUMENTS

| | | | | |
|---|---|---|---|---|
| 5,199,827 A | * | 4/1993 | Pantzar | B23C 5/2213 |
| | | | | 407/114 |
| 5,332,338 A | * | 7/1994 | Satran | B23C 5/207 |
| | | | | 407/42 |
| 5,365,805 A | * | 11/1994 | Pantzar | B23C 5/202 |
| | | | | 407/114 |
| 5,810,521 A | * | 9/1998 | Pantzar | B23B 27/145 |
| | | | | 407/114 |
| 6,733,214 B2 | * | 5/2004 | Scherbarth | B23C 5/207 |
| | | | | 407/113 |
| 6,884,006 B2 | * | 4/2005 | Nagashima | B23C 5/06 |
| | | | | 407/113 |
| 6,957,935 B2 | * | 10/2005 | Sung | B23C 5/202 |
| | | | | 407/113 |
| 7,220,083 B2 | * | 5/2007 | Festeau | B23C 5/205 |
| | | | | 407/113 |
| 2003/0039520 A1 | * | 2/2003 | Okamura | B23B 27/145 |
| | | | | 407/118 |
| 2004/0234349 A1 | * | 11/2004 | Ueda | C23C 30/005 |
| | | | | 407/113 |
| 2005/0123365 A1 | * | 6/2005 | Goudemond | B23P 15/28 |
| | | | | 407/113 |
| 2008/0226943 A1 | * | 9/2008 | Fang | C23C 28/044 |
| | | | | 428/697 |
| 2008/0304924 A1 | * | 12/2008 | Engstrom | B23C 5/202 |
| | | | | 407/114 |
| 2010/0215446 A1 | * | 8/2010 | Wandeback | B23C 5/202 |
| | | | | 407/51 |
| 2010/0272526 A1 | * | 10/2010 | Dufour | B23B 51/048 |
| | | | | 407/114 |
| 2013/0195569 A1 | * | 8/2013 | Gey | B23P 15/28 |
| | | | | 407/113 |
| 2014/0212231 A1 | * | 7/2014 | Kovac | B23C 5/207 |
| | | | | 407/114 |

FOREIGN PATENT DOCUMENTS

| | | | |
|---|---|---|---|
| CN | 107252917 A | | 10/2017 |
| EP | 0548752 A1 | | 6/1993 |
| JP | 05138409 A | * | 6/1993 |
| JP | H05-253730 A | | 10/1993 |
| JP | H09174323 A | | 7/1997 |

* cited by examiner

INDEXABLE FACE MILLING CUTTING INSERT AND FACE MILLING CUTTING HEAD USING THE CUTTING INSERT

TECHNICAL FIELD

The disclosure relates to the field of face milling cutter, and in particular to an indexable face milling cutting insert and face milling cutting head using the cutting insert.

BACKGROUND

A face milling cutter is a processing tool for processing a metallic plane of a large area, a cutting head of the face milling cutter generally includes two main components, namely a cutter head and an insert provided on the cutter head, and the insert is used for cutting and processing a metallic surface.

Generally, a cutting edge part of a component, namely an insert, for executing cutting and milling operation in the face milling cutter, is mainly made of a cutting material such as polycrystalline diamond and polycrystalline cubic boron nitride, the cutting material is generally high in price, and the price is determined by square millimeter. In order to reduce the cost of the face milling cutter, in a related technology, the cutting material is laminated on an alloy substrate of an insert to manufacture a composite insert generally. Where the alloy substrate and the cutting material are in stable transition, for example, the alloy substrate is generally a prismoid or a cuboid, and is precisely positioned on a face milling cutter head via a side surface and/or a bottom surface of the alloy substrate, thereby ensuring mounting precision of the alloy substrate; the cutting material laminated on the alloy substrate is adopted for cutting.

After long-term cutting of the metallic surface, a cutting edge made of the cutting material is definitely abraded, if the cutting edge is directly abandoned, material waste may be caused, and very high production cost can be resulted, therefore, the face milling cutter is generally polished in a milling company, then the sharpness of the cutting edge may be improved, and repeated use of the face milling cutter is achieved.

However, in a polishing process, the alloy substrate may also be abraded together, then a side surface having a positioning function may be deformed, positioning failure may be caused, the insert may be vibrated in a milling process, and processing precision of milling processing may be acutely degraded.

In addition, the face milling cutter is classified as a face cutting milling and a wiper face milling according to different cutting precision and effects, with a corresponding cutting insert and a wiper insert, in the milling process, an angle formed by a cutting edge of the cutting insert and a surface to be processed is different from an angle formed by a cutting edge of the wiper insert and the surface to be processed, therefore, in the related technology, two face milling cutter of different structures are used for different purposes, that is, the face cutting milling and wiper face milling are not applicable to a same cutter head, when both the face cutting milling and wiper face milling need to be mounted on the cutter head, a cutter head with both a wiper milling insert retaining slot and a cutting milling insert retaining slot needs to be particularly arranged, therefore, both positions and quantities for mounting the wiper face milling and the face cutting milling on the cutter head are fixed, and cannot be flexibly adjusted according to needs.

Therefore, a face cutting milling, a wiper face milling and a face milling cutting head which are capable of both avoiding positioning failure and applicable to a same insert retaining slot need to be developed urgently.

SUMMARY

Some embodiments of the disclosure provides a face milling cutter and a face milling cutting head with the face milling cutter, and solves the problems that the face milling cutter is failed in positioning after polishing and a face cutting milling and a wiper face milling are not applicable to a same cutter head.

In an exemplary embodiment, the disclosure provides a face milling cutter which includes an insert body 1 and a cutting body 2 laminated on the insert body 1, the indexable face milling cutting insert is approximately prismoid-shaped, the insert body 1 and the cutting body 2 are in smooth transition, the insert body 1 comprises multiple positioning side surfaces 11, an upper plane 12, and a positioning bottom surface 13, the cutting body 2 is laminated on the upper plane 12 of the insert body 1, an area of the upper plane 12 is larger than an area of the positioning bottom surface 13, and a projection $l_2$ of an edge of the positioning bottom surface 13, or an extension line thereof, on a rake face 21 is intersected with a corresponding edge or a of the rake face 21, or an extension line $l_3$ thereof, to form a surface deflection angle 23.

In an exemplary embodiment, the upper plane 12 of the indexable face milling cutting insert is rotated clockwise or counterclockwise relative to the positioning bottom surface 13 around a central shaft of the indexable face milling cutting insert.

In an exemplary embodiment, an end surface of the cutting body 2 contacting with a member to be processed is the rake face 21, multiple flank faces 3 are arranged at a front end of the multiple positioning side surfaces 11 of the indexable face milling cutting insert, the multiple positioning side surfaces 11, each of the multiple flank faces 3 and the rake face 21 are sequentially connected, more preferably, an included angle formed by each of the multiple flank faces 3 and the rake face 21 is greater than an angle of an included angle formed by each of the positioning side surfaces 11 and the rake face 21.

In an exemplary embodiment, the disclosure further provides a face milling cutting head using the face milling cutter, wherein the indexable face milling cutting insert disclosed in above embodiments is arranged in the face milling cutting head.

In an exemplary embodiment, the face milling cutting head further includes a face milling cutter head with the indexable face milling cutting insert, multiple face milling insert retaining slots 111a are formed in the face milling cutter head, and a shape of each of the multiple face milling insert retaining slots is matched with a shape of the indexable face milling cutting insert, and each of the multiple face milling insert retaining slots includes a pre-positioning surface 114a, a first positioning side surface 115a and a second positioning side surface 116a.

In an exemplary embodiment, the face milling cutter head includes a horn-shaped cutter head main body 1a and an adjusting block 2a and a locking wedge block 3a, the adjusting block 2a and the locking wedge block 3a are provided on the cutter head main body 1a, wherein the cutter head main body 1a includes a milling insert holder 11a and a cutter stem connecting portion 12a and a transition portion 13a, the transition portion 13a is arranged between the milling insert holder 11a and the cutter stem connecting portion 12a, wherein the milling insert holder 11a is circular cylinder shaped or hollow truncated cone shaped, the multiple face milling insert retaining slots 111a and multiple wedge block mounting scrap discharge slots 112a which are communicated with adjacent face milling insert retaining slots 111a are formed in a working end surface of the milling insert holder 11a, and multiple milling insert support bases 113a are formed on a working end surface of the milling insert holder 11a;

a first preset angle is formed by the second positioning side surface 116a and a plane of an end surface of the milling insert holder 11a, the first positioning side surface 115a and the end surface of the milling insert holder 11a form a radial front angle 1151a, and the first positioning side surface 115a and an axis of the milling insert holder 11a form an axial front angle 1152a.

In an exemplary embodiment, wedge block mounting holes 118a are formed in the wedge block mounting scrap discharge slots 112a in a radial direction of the milling insert holder 11a, each of the wedge block mounting holes 118a is a step hole, wherein hole of each of the wedge block mounting holes 118a close to the wedge block mounting scrap discharge slots 112a is a wedge block telescopic adjusting hole 1181a, the wedge block telescopic adjusting hole 1181a is matched with a locking wedge block 3a, the aperture of the wedge block telescopic adjusting hole 1181a is slightly greater than an outer diameter of the locking wedge block 3a, and hole of each of the wedge block mounting holes 118a close to the milling insert holder 11a is a wedge block threaded locking hole 1182a with inner thread.

Above the multiple face milling insert retaining slots 111a, adjusting block mounting holes 119a are formed inwards from an outer wall of the milling insert holder 11a in a radial direction of the milling insert holder 11a, each of the adjusting block mounting holes 119a is a step hole, wherein hole of each of the adjusting block mounting holes 119a close to the outer wall of the milling insert holder 11a is an adjusting block telescopic adjusting hole 1191a and is matched with the adjusting block 2a, the aperture of the adjusting block telescopic adjusting hole 1191a is slightly greater than the adjusting block 2a, and hole of each of the adjusting block mounting holes 119a close to the milling insert holder 11a is an adjusting block threaded locking hole 1192a with inner thread.

In the multiple milling insert support bases 113a, locking holes 23a are formed inwards from a working end surface of the milling insert holder 11a in a direction perpendicular to an axes of the adjusting block mounting holes 119a.

The locking wedge block 3a is an eccentric cylinder, and an avoiding slot 31a is formed in an outer wall of the locking wedge block 3a.

The adjusting block 2a includes a guide track portion 21a and an adjusting platform 22a.

BRIEF DESCRIPTION OF THE DRAWINGS

In order to describe the technical solutions in the embodiments of the disclosure more clearly, the drawings required to be used in descriptions about the embodiments will be simply introduced below. It is apparent that those of ordinary skill in the art may further obtain other drawings according to these drawings without creative work.

BRIEF DESCRIPTION OF THE DRAWINGS

Figure 1:
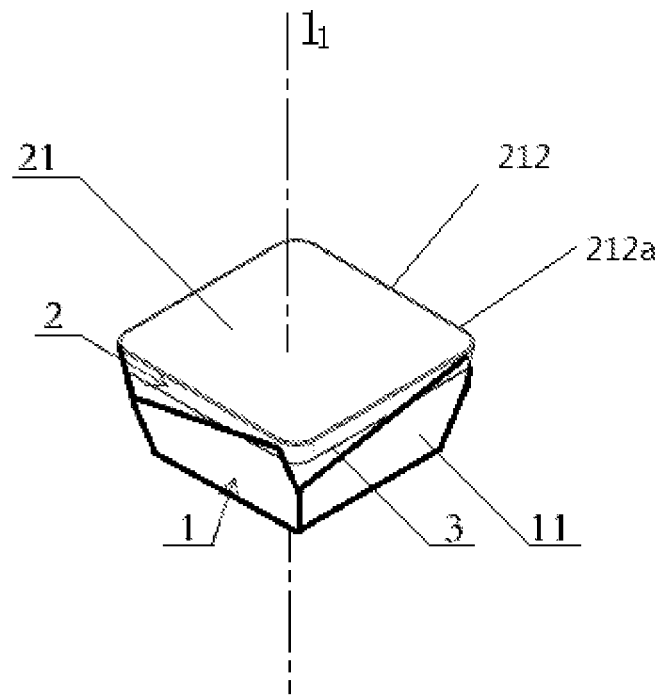
FIG. 1 shows a structure diagram of an indexable face milling cutting insert in an optional embodiment of the disclosure.
Figure 2A:
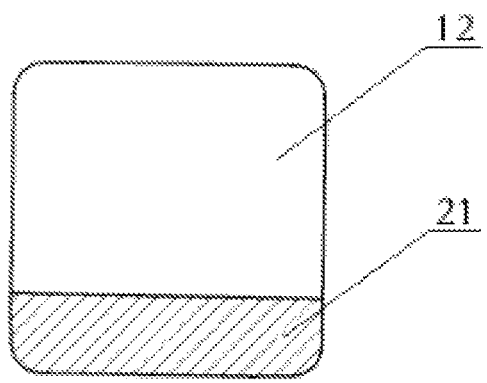
FIG. 2a shows a structure diagram of an indexable face milling cutting insert with one strip cutting body in the disclosure.
Figure 2B:
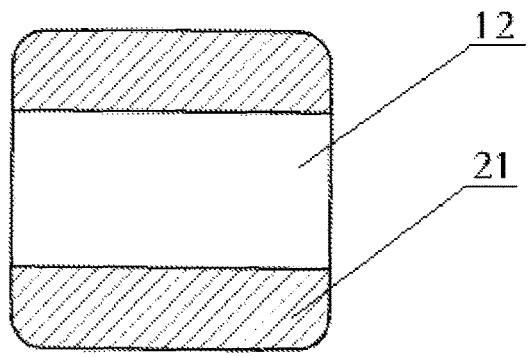
FIG. 2b shows a structure diagram of an indexable face milling cutting insert with two strip normal cutting bodies in the disclosure.
Figure 2C:
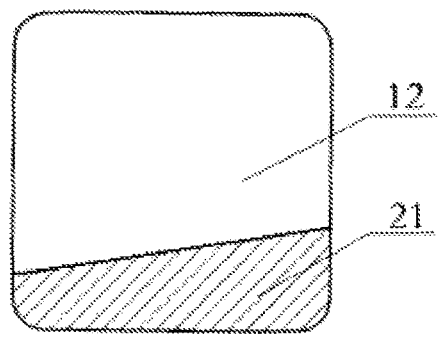
FIG. 2c shows a structure diagram of an indexable face milling cutting insert with one strip irregular cutting body in the disclosure.
Figure 2D:
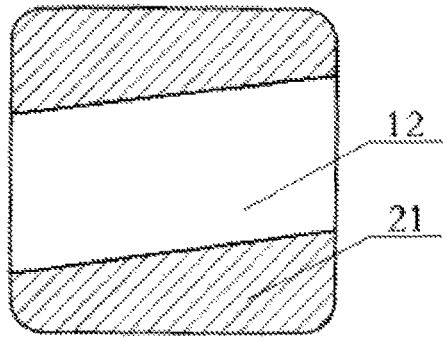
FIG. 2d shows a structure diagram of an indexable face milling cutting insert with two strip irregular cutting bodies in the disclosure.
Figure 3A:
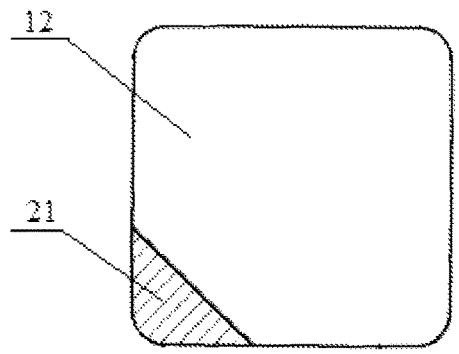
FIG. 3a shows a structure diagram of an indexable face milling cutting insert with one block cutting body in the disclosure.
Figure 3B:
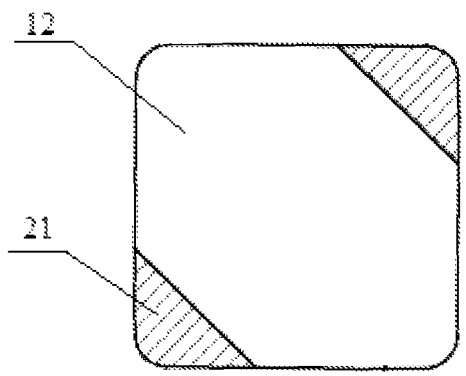
FIG. 3b shows a structure diagram of an indexable face milling cutting insert with two block cutting bodies in the disclosure.
Figure 3C:
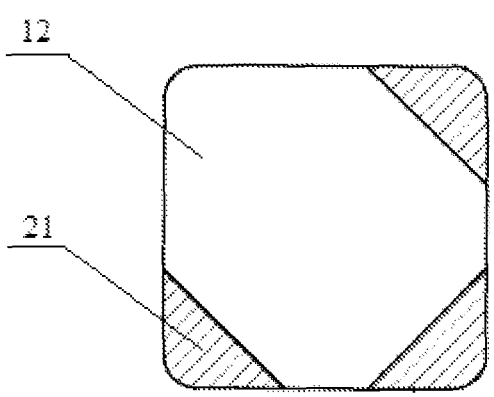
FIG. 3c shows a structure diagram of an indexable face milling cutting insert with three block cutting bodies in the disclosure.
Figure 3D:
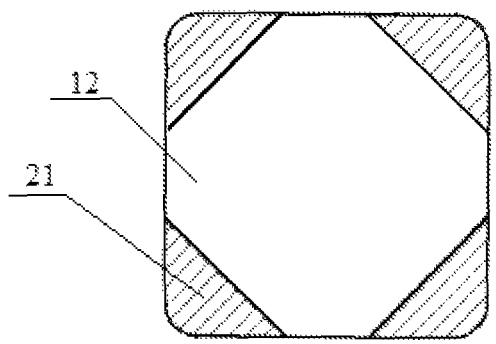
FIG. 3d shows a structure diagram of an indexable face milling cutting insert with four block cutting bodies in the disclosure.

1—insert body, 11—positioning side surface, 12—upper plane, 13—positioning bottom surface, 2—cutting body, 21—rake face, 22—cutting edge deflection angle, 23—surface deflection angle, 3—flank face, $1_1$—central shaft of indexable face milling cutting insert, $1_2$—projection of edge of positioning bottom surface or an extension line thereof on rake face, $1_3$—edge or extension line thereof corresponding to $1_2$ on rake face, BS—length of wiper edge, R—radius of arc of wiper edge, theta—cutting edge rear angle, theta1—positioning angle, gamma—deflection angle, a—first cutting edge deflection angle, a2—third cutting edge deflection angle, 1a—cutter head main body, 11a—milling insert holder, 111a—face milling insert retaining slots, 112a—wedge block mounting scrap discharge slot, 113a—milling insert support base, 114a—pre-positioning surface, 115a—first positioning side surface, 1151a—radial front angle, 1152a—axial front angle, 116a—second positioning side surface, 1171a—first avoiding slot, 1172a—second avoiding slot, 118a—wedge block mounting hole, 1181a—wedge block telescopic adjusting hole, 1182a—wedge block threaded locking hole, 119a—adjusting block mounting hole, 1191a—adjusting block telescopic adjusting hole, 1192a—adjusting block threaded locking hole, 12a—stem connecting portion, 121a—key slot, 13a—transition portion, 2a—adjusting block, 21a—guide track portion, 22a—adjusting platform, 221a—adjusting block locking positioning surface, 222a—adjusting surface, 23a—locking hole, 3a—locking wedge block, 31a—avoiding slot, 32a—wedge block locking surface, 4a—coolant spraying plate.

DETAILED DESCRIPTION OF THE EMBODIMENTS

In order to make the characteristics and advantages of the disclosure clearer and definite, the disclosure will further be described below.

The specific word "exemplary" means "as example, embodiment or description". Any embodiment as "exemplary" is not interpreted as being prior to or better than other embodiments. Although various aspects of embodiments are illustrated in drawings, unless otherwise specified, drawings do not need to be drawn according to dimensions.

In the disclosure, the orientation or positional relationship indicated by the terms "up", "down", "left", "right", "inner", "outer", "front end", "rear end", "head", "tail", etc. is the orientation or positional relationship shown in the drawings, which is merely for the convenience of describing the present disclosure and simplifying the description, and does not indicate or imply that the referred device or element must have a specific orientation and must be constructed and operated in a specific orientation, and thus it cannot be construed as a limitation of the present disclosure. Moreover, the terms "first," "second," "third," etc., are used for descriptive purposes merely, and cannot be construed as indicating or implying relative importance.

The disclosure is specifically described below.

According to a, the disclosure provides an indexable face milling cutting insert which includes an insert body 1 and a cutting body 2 laminated on the insert body 1, the indexable face milling cutting insert is approximately prismoid-shaped, the insert body 1 and the cutting body 2 are in smooth transition, the insert body 1 comprises multiple positioning side surfaces 11, an upper plane 12, and a positioning bottom surface 13, the cutting body 2 is laminated on the upper plane 12 of the insert body 1, an area of the upper plane 12 is larger than an area of the positioning bottom surface 13, and a projection $1_2$ of an edge of the positioning bottom surface 13, or an extension line thereof, on a rake face 21 is intersected with a corresponding edge of the rake face 21, or an extension line $1_3$ thereof, to form a surface deflection angle 23.

In an embodiment of the disclosure, the insert body 1 is made of a metal, preferably a hard alloy.

In an embodiment of the disclosure, the cutting body 2 is made of a high-hardness cutting material, the high-hardness cutting material is selected from one or more of Cubic Boron Nitride (CBN), Polycrystalline Diamond (CVD), Polycrystalline Cubic Boron Nitride (PCBN) and the like, preferably PCBN.

In an embodiment of the disclosure, the insert body 1 is fixedly connected with the cutting body 2.

In another embodiment of the disclosure, the indexable face milling cutting insert may be also made of the cutting body 2 in an integral processing manner.

In the disclosure, the indexable face milling cutting insert is approximately takes the shape of a square prismoid, a five-prismoid, a six-prismoid, a seven-prismoid or an eight-prismoid, preferably the square prismoid, the five-prismoid or the six-prismoid.

When the indexable face milling cutting insert takes the shape of square to eight prismoid, multiple cutting edges are provided on a same piece of insert simultaneously, after one cutting edge is abraded, cutting edge alternation is achieved by rotating the face milling cutter, then a polygon structure of the face milling cutter is sufficiently utilized, and the service life of the face milling cutter is prolonged.

Applicant finds that if the indexable face milling cutting insert is the square prismoid, the face milling cutter is well stably fixed on a cutter head, meanwhile, the cutting edge has an appropriate length, and both cutting precision and cutting efficiency can be ensured.

In the disclosure, the upper plane 12 is a top surface where the insert body 1 is connected with the cutting body 2, the rake face 21 is a top surface of the cutting body 2, as shown in FIG. 1 to FIG. 3d, the cutting body 2 is laminated on the upper plane 12, and preferably, the rake face 21 is parallel to an exposed part of the upper plane 12.

In one embodiment of the disclosure, as shown in FIG. 1, the cutting body 2 covers the upper plane 12 of the insert body 1 and is polygon-shaped corresponding to the insert body 1.

In the embodiment, as shown in FIG. 2a to FIG. 2d, the cutting body 2 is arranged along an edge of the insert body 1 and is strip-shaped, optionally, the cutting body 2 is arranged along one side of the insert body 1, or along two sides parallel to each other in the insert body 1 respectively.

Applicant finds that the cutting body 2 is capable of conveniently fixedly connecting the insert body 1 with the cutting body 2, and meanwhile the cutting material can be saved.

In another preferable embodiment of the disclosure, as shown in FIG. 3a to FIG. 3d, the cutting body 2 is arranged at a cutter tip, and is approximately triangle-shaped or approximately quadrangle-shaped.

Applicant finds that by adopting the cutting body 2, the cutting material may be saved to the maximum extent, and the production cost can by greatly reduced.

In the disclosure, a face of the cutting body 2 contacting with a member to be processed is the rake face 21.

Figure 7:
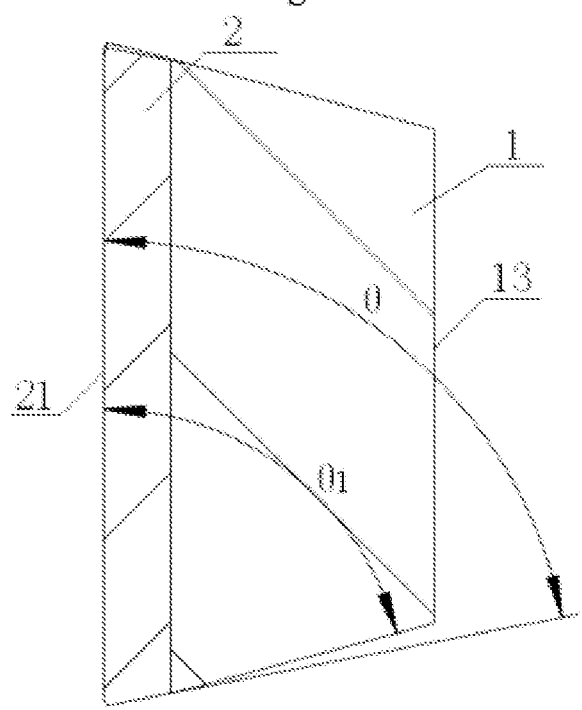
FIG. 7 shows a side view of the indexable face milling cutting insert in the disclosure.

In an embodiment of the disclosure, the indexable face milling cutting insert is approximately prismoid-shaped, an area of the upper plane 12 is larger than an area of the positioning bottom surface 13, at least the multiple flank faces 3 and the multiple positioning side surfaces 11 are arranged between the rake face 21 and the positioning bottom surface 13, as shown in FIG. 7, each of the multiple flank faces 3 and the rake face 21 form a cutting edge rear angle θ, each of the multiple positioning side surfaces 11 and the rake face 21 form a positioning angle θ1, and θ>θ1, therefore, each of the multiple positioning side surfaces 11 is inclined towards an axis direction of the face milling cutter when being compared with the multiple flank faces 3, the multiple positioning side surfaces 11 are prevented from contacting a metallic surface to be processed when the face milling cutter is clamped on the cutter head, a stable and long-term stable positioning reference is achieved, in addition, the friction between the indexable face milling cutting insert and the metallic surface to be processed is reduced, that is, cutting resistance is reduced, and milling processing precision, efficiency and processing cover areas are increased.

In an embodiment of the disclosure, the upper plane 12 of the insert body is polygon-shaped, such as a regular triangle, a square, a rhombus, a parallelogram, a regular octagon or other specific shape corresponding to the prismoid, and when the body is a prismoid, the upper plane 12 is a square.

Figure 6:
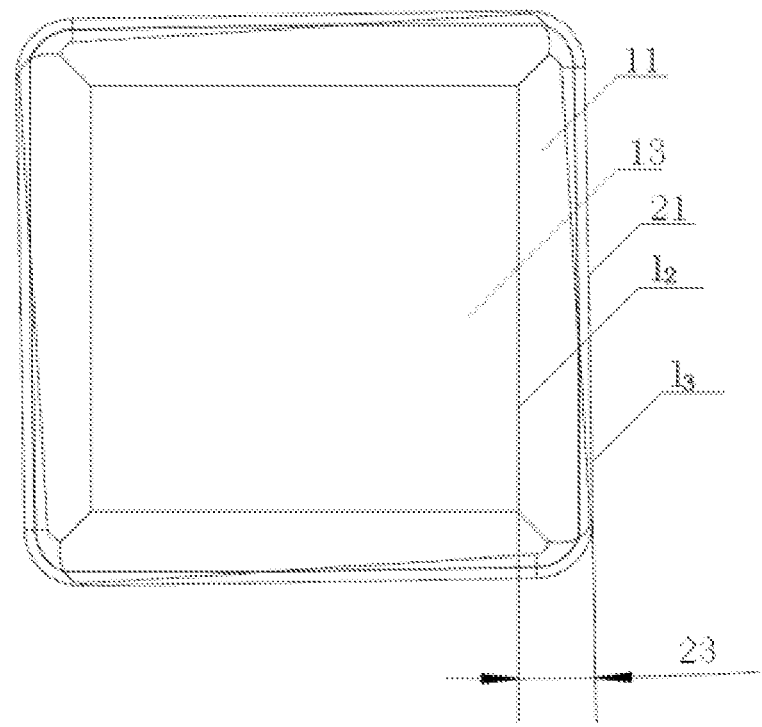
FIG. 6 shows a bottom view of the indexable face milling cutting insert in the disclosure.

In the disclosure, as shown in FIG. 1 and FIG. 6, the indexable face milling cutting insert is shaped by rotating the upper plane of the regular prismoid around the central shaft $1_1$ of the regular prismoid, that is, the projection $1_2$ of the edge of the positioning bottom surface 13, or the extension line thereof, on the rake face 21 is intersected with the corresponding edge of the rake face 21, or the extension line thereof, to form the surface deflection angle 23.

In another preferable embodiment of the disclosure, the surface deflection angle is (−3°, +3°), preferably (−1°, +1°), wherein the upper plane 12 in the indexable face milling cutting insert is formed by rotating clockwise around a central shaft $1_1$ of the upper plane 12, that is, the surface deflection angle is (0°, +3°), and the upper plane 12 in the indexable face milling cutting insert is formed by rotating counterclockwise around the central shaft $1_1$ of the upper plane 12, that is, the surface deflection angle is (−3°, 0°).

Applicant finds that when the surface deflection angle 23 is (−3°, +3°), after the indexable face milling cutting insert is mounted on face milling insert retaining slot in the cutter head, a preset angle is formed between the indexable face milling cutting insert and a surface to be processed, and then the surface to be processed may be milled; meanwhile, in a rotation angle, the multiple flank faces 3 are processed on the multiple positioning side surfaces 11 of the milling insert, when the surface deflection angle 23 is greater than (−3°, +3°), an area of the multiple positioning side surfaces 11 may be reduced and inaccurate positioning may be caused when each of the multiple flank faces 3 is processed, and then the indexable face milling cutting insert may be failed. In the disclosure, a wiper edge is clung to a surface of a member to be processed in milling processing, that is, an included angle of 0 degree is formed between the wiper edge and the process of the member to be processed.

In an embodiment of the disclosure, a wiper face milling is formed by enabling the upper plane 12 of the wiper face milling to rotate counterclockwise around a central shaft of the upper plane 12, and −3°<the surface deflection angle 23<0°.

In the disclosure, in milling processing, an included angle formed by the cutting edge and the surface of the member to be processed is greater than 0 degree, an included angle formed by the cutting edge and the surface of the member is 0-3 degrees, a face cutting milling is formed by enabling the upper plane 12 to rotate clockwise around the central shaft of the upper plane 12, and 0°<the surface deflection angle 23<3°.

In the disclosure, each of the multiple positioning side surfaces 11 is intersected with each of the multiple flank faces 3 to form a preset angle, and the positioning side surfaces 11 are prevented from being damaged when the cutting edge is polished.

Under the comprehensive action of the cutting edge rear angle θ and the surface deflection angle 23, different positioning surfaces, flank faces and cutting edge structures are formed on a surface of the face milling cutter, specifically shown in FIG. 4a to FIG. 4f.

Figure 4A:
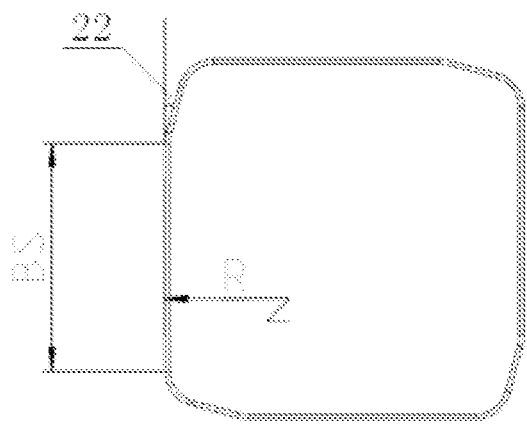
FIG. 4a shows a top view of an indexable wide arc-shaped wiper face milling in the disclosure.

In another preferable embodiment of the disclosure, as shown in FIG. 4a, two adjacent positioning side surfaces 11 in the cutting body 2 form a cutting edge deflection angle 22, the cutting edge deflection angle 22 is (0°, +75°) in the disclosure, and when the cutting edge deflection angle is (0°, +45°), a large radial force and a small axial force are resulted; when the cutting edge deflection angle is 45°, a milling insert holder has a radial force equal to an axial force, and when the cutting edge deflection angle is (+45°, +75°), the radial force of the milling insert holder is reduced, and the axial force is increased. The smaller a radial cutting force is, the smaller the member deformation influence is, therefore, different cutting edge deflection angles may be selected for different processing members.

Applicant finds that a length of the wiper edge is directly related to processing surface roughness and processing efficiency, and the longer a wiper edge is, the higher then surface roughness of surface milling process is, and the higher the processing efficiency is; the shorter the wiper edge is, the lower then surface roughness of surface milling process is, and the lower the processing efficiency is; Applicant finds that in a preset specification of the indexable face milling cutting insert, when the indexable face milling cutting insert is square-eight prismoid-shaped, the length of the cutting edge is capable of meeting requirements of face milling processing precision, and meanwhile, high processing efficiency may be achieved.

Figure 4B:
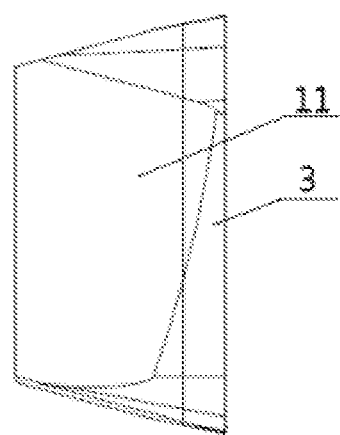
FIG. 4b shows a side view of the indexable wide arc-shaped wiper face milling in the disclosure.
Figure 4C:
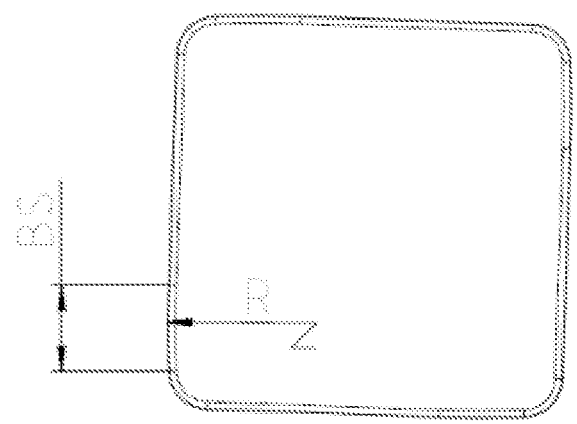
FIG. 4c shows a top view of an indexable narrow arc-shaped wiper face milling in the disclosure.
Figure 4D:
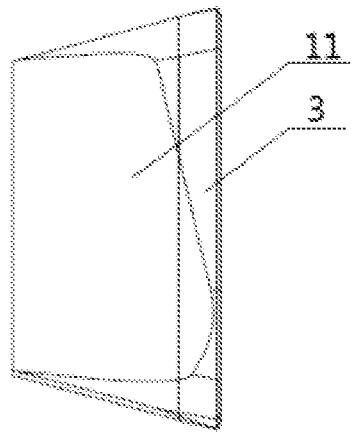
FIG. 4d shows a side view of the indexable narrow arc-shaped wiper face milling in the disclosure.
Figure 4E:
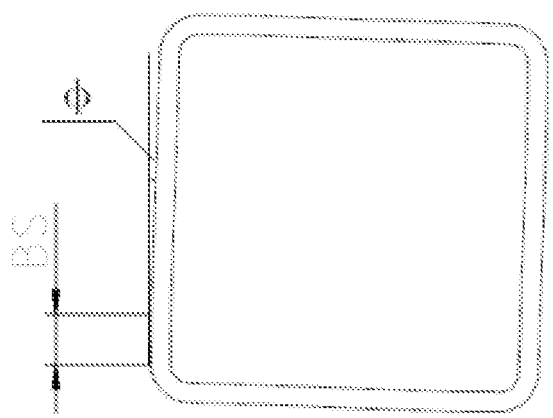
FIG. 4e shows a top view of an indexable deflection angle wiper face milling in the disclosure.
Figure 4F:
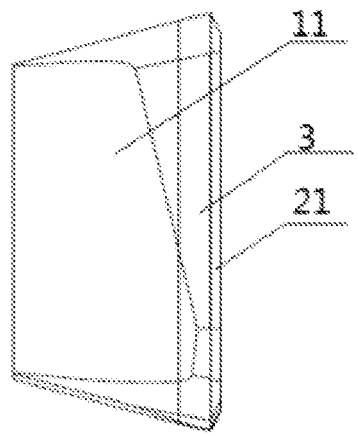
FIG. 4f shows a side view of the indexable deflection angle wiper face milling in the disclosure.

In the disclosure, as shown in FIG. 4a to FIG. 4f, BS represents the length of the wiper edge, and the wiper edge may be a wide arc-shaped wiper edge, a narrow arc-shaped wiper edge or a deflection angle wiper edge. FIG. 4a and FIG. 4b show top views of a wide arc-shaped wiper face milling, wherein BS is within 2-7 mm, and the arc-shaped radius of the wiper edge is within 20-500 mm; FIG. 4c and FIG. 4d show a narrow arc-shaped wiper face milling, wherein BS is within 0.2-2 mm, and the arc-shaped radius of the wiper edge is within 3-20 mm; FIG. 4e and FIG. 4f show a deflection angle wiper face milling, wherein BS is within 0.2-2 mm, and a defection angle φ is within 0-2°.

In one preferable embodiment of the disclosure, each of ridges of the rake face 21 is cutting edge, preferably, the cutting edge is arc-shaped, the arc-shaped radiuse is a cutter tip radius, the cutter tip radius is 0-2.0 mm, preferably 0.8 mm; Applicant finds that when the cutter tip radius is 0.8 mm, the cutting edge of the indexable face milling cutting insert has a large effective length and high cutting edge strength, and a boundary scratch is not easily formed on the metallic surface to be processed.

Figure 5A:
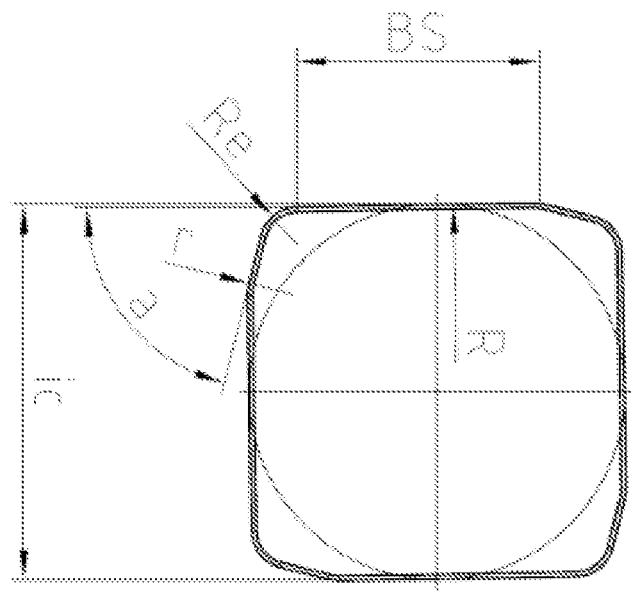
FIG. 5a shows a top view of an embodiment of the indexable face milling cutting insert in the disclosure.
Figure 5B:
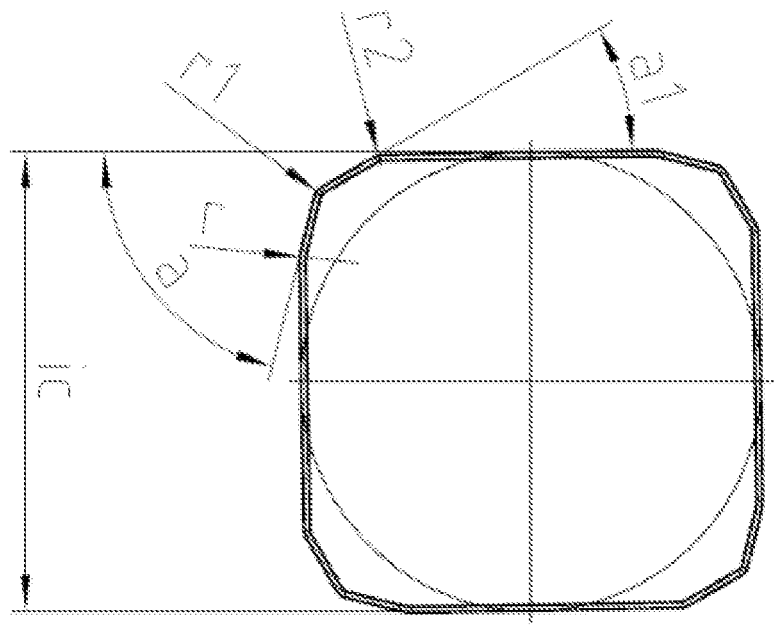
FIG. 5b shows a top view of another embodiment of the indexable face milling cutting insert in the disclosure.
Figure 5C:
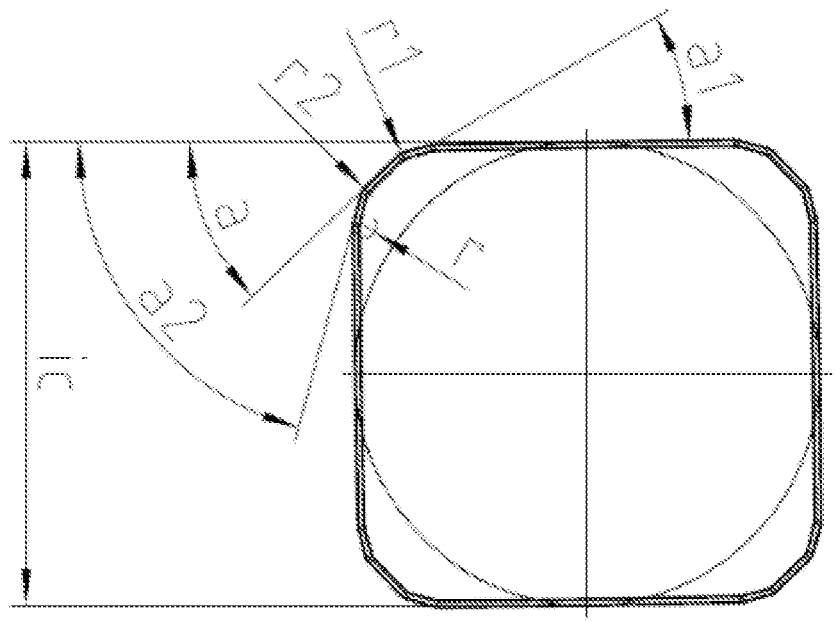
FIG. 5c shows a top view of another embodiment of the indexable face milling cutting insert in the disclosure.

In another embodiment of the disclosure, as shown in FIG. 5a, FIG. 5b and FIG. 5c, the cutting edge includes at least one line-shaped cutting edge and at least one arc-shaped cutting edge which are connected, and the radius of the arc-shaped cutting edge is 0-0.2 mm.

In one embodiment of the disclosure, as shown in FIG. 5a, the cutting edge of the rake face 21 includes one line-shaped cutting edge and one arc-shaped cutting edge, and a first cutting edge deflection angle a is (+45°, +90°).

In another embodiment of the disclosure, as shown in FIG. 5b, the cutting edge of the rake face 21 includes two line-shaped cutting edges, an arc-shaped cutting edge for smooth transition is arranged between two adjacent line-shaped cutting edges, the first cutting edge deflection angle a is (+45°, +90°), and a second cutting edge deflection angle a1 is (+15°, +45°).

In another embodiment of the disclosure, as shown in FIG. 5c, the cutting edge of the rake face 21 includes three line-shaped cutting edges, an arc-shaped cutting edge for smooth transition is arranged between every two adjacent line-shaped cutting edges, the first cutting edge deflection angle a is (+45°, +90°), the second cutting edge deflection angle a1 is (+15°, +45°), and a third cutting edge deflection angle a1 is (+60°, +90°).

In an embodiment of the disclosure, as shown in FIG. 7, a side surface between the rake face 21 and the positioning bottom surface 13 includes two surfaces of ea multiple flank face 3 and a positioning side surface 11, the multiple flank face 3 and the rake face 21 form the cutting edge rear angle θ, the positioning side surface 11 and the rake face 21 form the positioning angle θ1, θ>θ1, therefore, the positioning side surface 11 is inclined inwards when being compared with the flank face 3, the positioning side surface 11 does not contact the metallic surface to be processed when the member is processed after the indexable face milling cutting insert is clamped on the cutter head, in the processing process, the rake face 21 and the flank face 3 are abraded, but in the structure, the positioning side surface 11 does not contact the metallic surface to be processed, and thus a phenomenon of inaccurate positioning caused by abrasion of the positioning side surface is avoided. Meanwhile, the positioning side surface 11 is prevented from being damaged when the cutting edge is polished, so that a stable and long-term positioning reference is ensured, the cutting edge rear angle θ is within (+77°, +82°), preferably 79°, the smaller then cutting edge rear angle θ is, the sharper the cutting edge is, and the positioning angle θ1 is within (+73°, +77°), preferably 75°.

In the disclosure, when being used, the indexable face milling cutting insert is clamped in the face milling insert retaining slots of the cutter head through the multiple positioning side surfaces 11 and the positioning bottom surface 13, as the shape of the face cutting milling is approximate to the shape of the wiper face milling, and the face cutting milling and the wiper face milling have the difference that the upper planes thereof are rotated in different rotation directions around the central shaft of the upper planes, the face milling cutter in two rotation directions are applicable to one same face milling cutter head, that is, the two indexable face milling cutting inserts for different purposes may be used in a same face milling insert retaining slot, and in addition, a retaining slot for clamping the wiper face milling does not need to be formed in the cutter head.

In another embodiment of the disclosure, the disclosure further provides a face milling cutting head using the indexable face milling cutting insert, wherein the indexable face milling cutting insert described in the first aspect is arranged in the face milling cutting head.

In the disclosure, the face milling cutting head further includes the face milling cutter head for clamping the indexable face milling cutting insert.

The face milling cutter head includes a horn-shaped cutter head main body 1a and multiple adjusting blocks 2a and multiple locking wedge blocks 3a, and the multiple adjusting blocks 2a and the multiple locking wedge blocks 3a are provided on the cutter head main body 1a.

Figure 8:
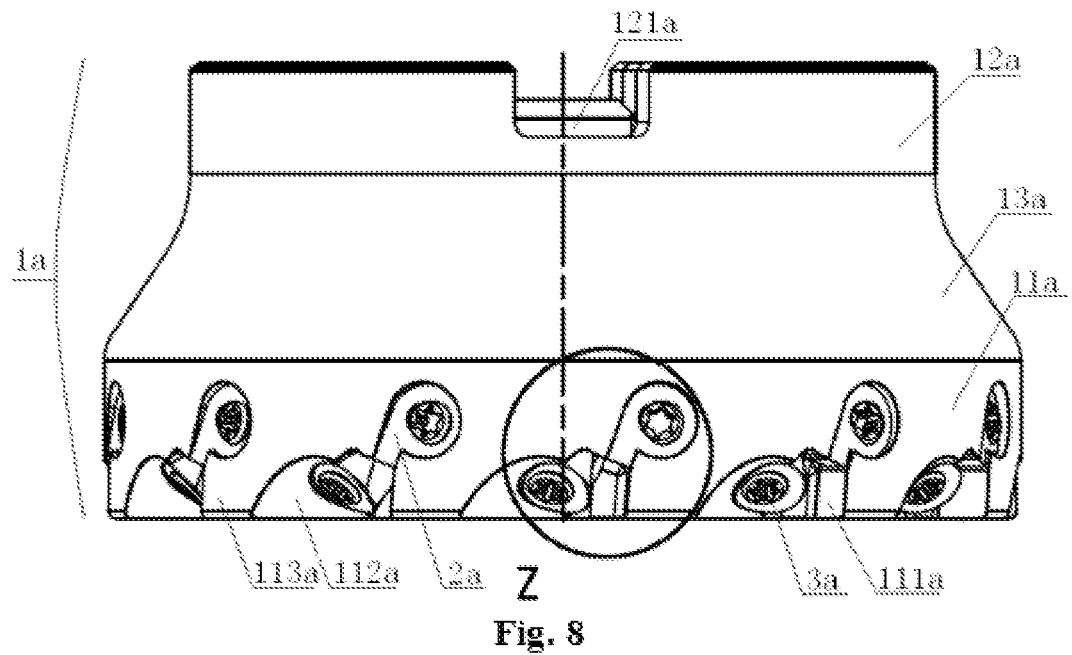
FIG. 8 shows a structure diagram of a face milling cutter head in the disclosure.

In the disclosure, as shown in FIG. 8, the cutter head main body 1a includes a milling insert holder 11a and a cutter stem connecting portion 12a and a transition portion 13a, the cutter stem connecting portion 12a and the transition portion 13a are arranged between the milling insert holder 11a and the cutter stem connecting portion 12a, the milling insert holder 11a is circular cylinder shaped or hollow truncated cone shaped, the cutter stem connecting portion 12a is also circular cylinder shaped, the transition portion 13a is hollow truncated cone shaped, the outer diameter of the milling insert holder 11a may be larger than, equal to or smaller than the outer diameter of the cutter stem connecting portion 12a, and preferably, the outer diameter of the milling insert holder 11a is greater than the outer diameter of the cutter stem connecting portion 12a.

In the disclosure, as shown in FIG. 8, a key slot 121a is formed in a top end of the cutter stem connecting portion 12a, when the cutter head is connected with a cutter stem, a key block on the cutter stem is mounted in match with the key slot 121a in the cutter head, so as to conduct a twisting force.

In one preferable embodiment of the disclosure, the cutter head main body 1a is integrally formed.

In the disclosure, the milling insert holder 11a is circular cylinder shaped or hollow truncated cone shaped, multiple face milling insert retaining slots 111a and multiple wedge block mounting scrap discharge slots 112a which are communicated with adjacent face milling insert retaining slots 111a are formed in a working end surface of the milling insert holder 11a, multiple milling insert support bases 113a are formed on a working end surface of the milling insert holder 11a, the number of the wedge block mounting scrap discharge slots 112a is 1-50, and for different cutter heads, the number of the wedge block mounting scrap discharge slots 112a is determined by diameters of the cutter heads.

In one preferable embodiment of the disclosure, the milling insert support bases 113a are uniformly distributed on the milling insert holder 11a.

Figure 9:
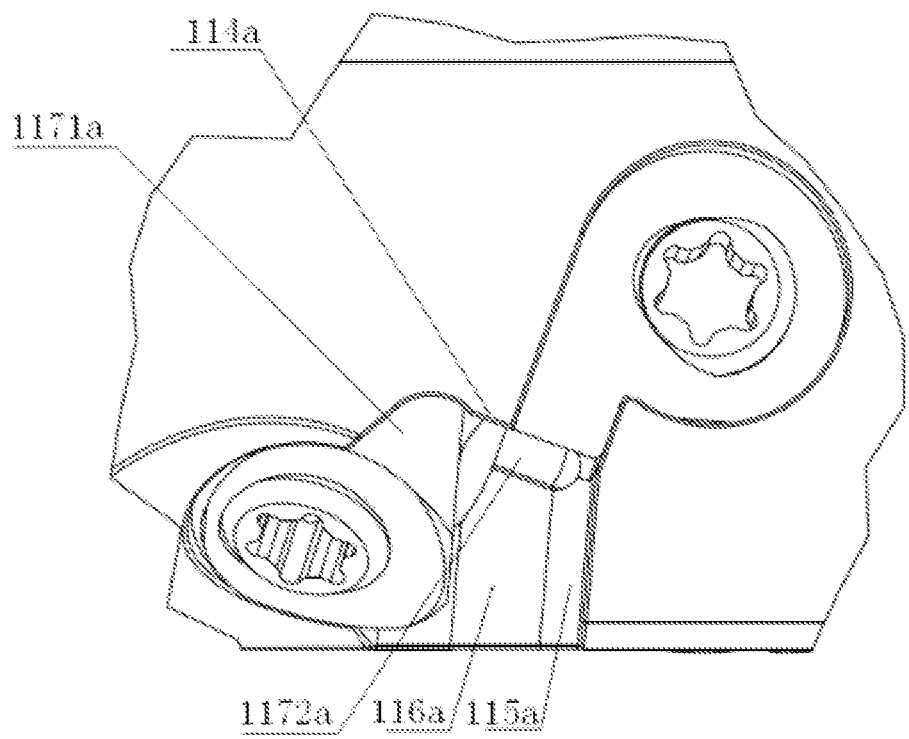
FIG. 9 shows an amplification view of a part Z in the FIG. 8.
Figure 10:
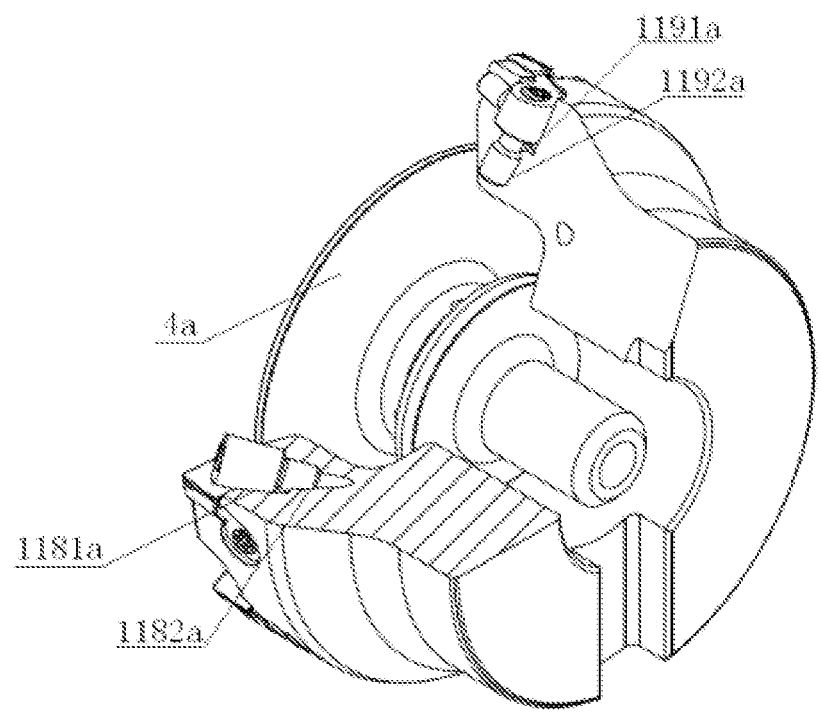
FIG. 10 shows a diagrammatic cross-section of the face milling cutter head in the disclosure.
Figure 11:
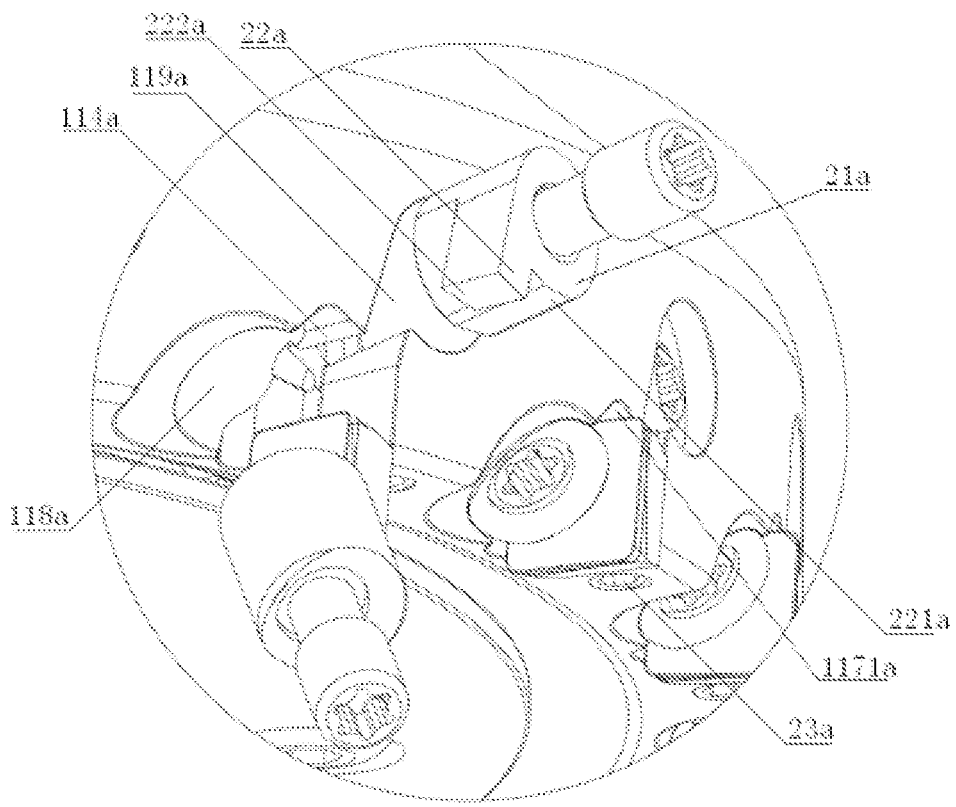
FIG. 11 shows an explosion diagram of the part Z in the FIG. 8.
Figure 15:
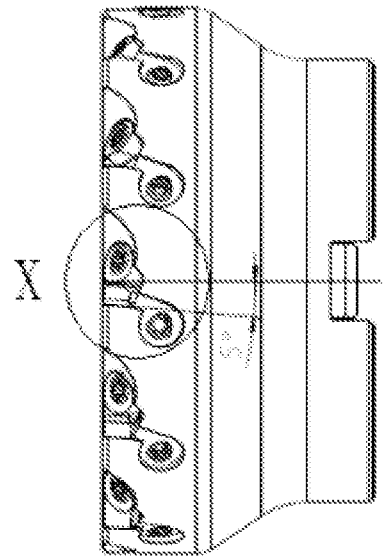
FIG. 15 shows a side view of a cutting head of one embodiment.
Figure 16:
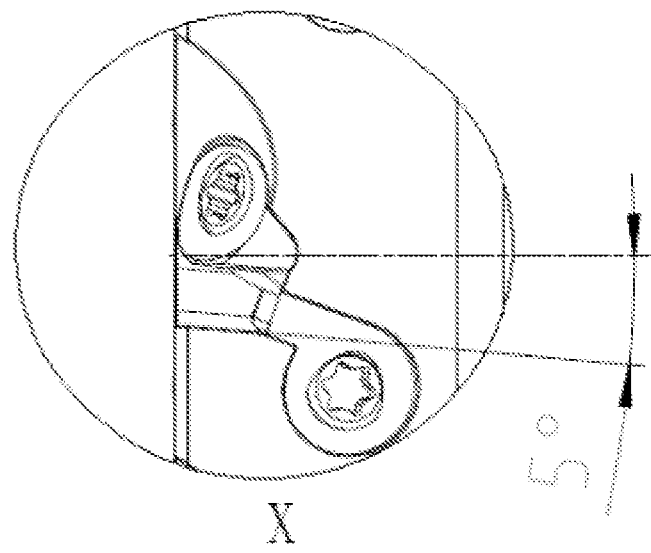
FIG. 16 shows an amplification view of a part X in the FIG. 15.
Figure 17:
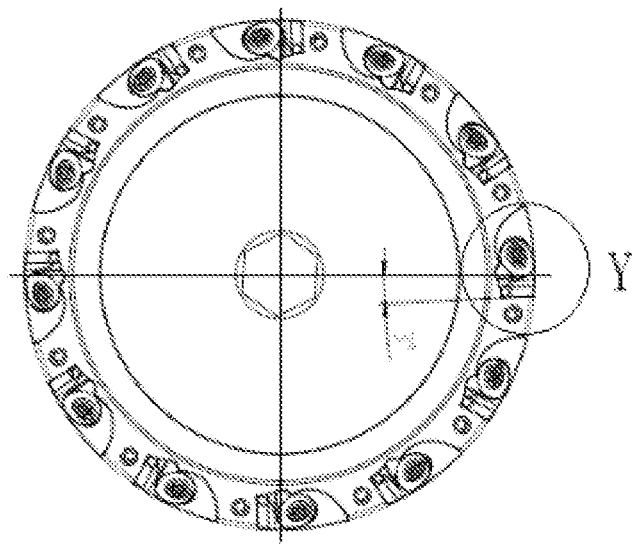
FIG. 17 shows a top view of the cutting head of one embodiment.
Figure 18:
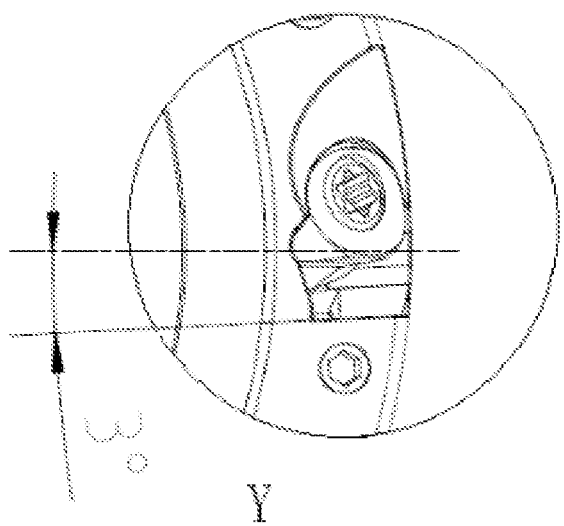
FIG. 18 shows an amplification view of a part Y in the FIG. 17.

In the disclosure, the shape of each of the face milling insert retaining slots 111a is matched with the shape of the used face milling cutter, as shown in FIG. 9, each of the face milling insert retaining slots 111a include a pre-positioning surface 114a, a first positioning side surface 115a and a second positioning side surface 116a, the second positioning side surface 116a and a plane of an end surface of the milling insert holder 11a form a first preset angle, the first positioning side surface 115a and an axis of the cutter head form an axial front angle, the first positioning side surface 115a and the end surface of the cutter head form a radial front angle, and as shown in FIG. 15- to FIG. 18, the axial front angle is 5 degrees, and the radial front angle is 3 degrees.

In the disclosure, the face milling cutter used in match with the face milling cutter head of the disclosure is prism-shaped or prismoid-shaped, a face contacting the member to be processed is the rake face, a face parallel to and opposite to the rake face is the positioning bottom surface 13, a side surface arranged between the rake face and the positioning bottom surface 13 includes the flank face and the positioning side surface, that is, after the face milling cutter is mounted on the face milling cutter head, the positioning bottom surface 13 of the face milling cutter is clung to the first positioning side surface 115a of the face milling cutter head, and the positioning side surface of the face milling cutter is clung to a pre-positioning surface 114a of the face milling cutter head.

In the disclosure, the pre-positioning surface 114a is high in processing precision, under the condition that the used face milling cutter also has high precision, after the face milling cutter is mounted, even without correction, the whole face milling cutter is capable of meeting requirements of common milling processing precision, that is, the face milling cutter may be used directly, the operation of correction is reduced, being convenient and rapid to use.

In one preferable embodiment of the disclosure, the face milling insert retaining slots 111a are inclined to an interior of the milling insert holder 11a around a central axis of each of the face milling insert retaining slots 111a.

Applicant finds that when the face milling insert retaining slots 111a are inclined to the interior of the milling insert holder 11a, the face milling insert retaining slots 111a have large space, the face milling cutter has a large clining area with the first positioning side surface 115a, then the face milling cutter is stably fixed and is not liable to loose in the face milling insert retaining slots 111a, and furthermore the face milling processing stability is ensured.

In one preferable embodiment of the disclosure, the first preset angle is (+87°, +90°), preferably 89°.

The inventor finds that the second positioning side surface 116a and the plane of the end surface of the milling insert holder 11a form the angle of (+87°, +90°), then the face milling insert retaining slots 111a are conveniently processed, more importantly, under the condition, cutting edges and positioning side surfaces of different structures can be formed by only enabling each of the multiple flank faces of the face milling cutter to rotate clockwise or counterclockwise for (0°, +3°) relative to the positioning bottom surface 13 of the face milling cutter along the shaft of the rake face, in addition, the cutting edges and a working surface to be processed may also form included angles of different degrees, then different milling functions are achieved, that is, a cutting function or a polishing function, a rotation angle within (0°, +3°) is capable of ensuring the length of the cutting edge of the face milling cutter, preventing cutting edge missing, ensuring a sufficient positioning area to avoid inaccurate positioning, and meeting requirements of different milling processing processes. Therefore, the disclosure selects that an angle formed by the second positioning side surface 116a and the plane of the end surface of the milling insert holder 11a is (+87°, +90°).

In another preferable embodiment of the disclosure, a first avoiding slot 1171a is formed in a part contacting the cutting edge of the face milling cutter in each of the face milling insert retaining slots 111a, such as an arc-shaped slot or a rectangular slot, then direct contacting of the cutting edge of the face milling cutter with the milling insert holder 11a is avoided, the probability of cutting edge damage is reduced, and the face milling cutter may by mounted and used safely and reliably. In the face milling insert retaining slots 111a, at cross parts of the second positioning side surface 116a and the a pre-positioning surface 114a, second avoiding slots 1172a are formed, and then the insert has an adjusting gap in the mounting precision adjustment and telescopic movement process.

In one preferable embodiment of the disclosure, the wedge block mounting scrap discharge slots 112a are curved-surface slots which are arranged between adjacent milling insert support bases 113a, extend to parts in front of adjacent milling insert support bases 113a from back sides of the milling insert support bases 113a and are intersected with the face milling insert retaining slots 111a. After the insert is mounted and locked, curved surfaces and upper surfaces of the locking wedge blocks, that is, the arc-shaped surfaces, form overall scrap discharge slots as scrap discharge spaces, and then scrap discharge is achieved while cutting is implemented.

In the disclosure, the wedge block mounting holes 118a are formed in the wedge block mounting scrap discharge slots 112a in a radial direction of the milling insert holder 11a, each of the wedge block mounting holes 118a are step holes, a hole of each of the wedge block mounting holes 118a close to the wedge block mounting scrap discharge slots 112a is a wedge block telescopic adjusting hole 1181a, the wedge block telescopic adjusting hole is matched with the locking wedge block 3a, the aperture of the wedge block mounting hole 118a is slightly greater than the outer diameter of the locking wedge block 3a, and a hole of each of the wedge block mounting holes 118a close to the milling insert holder 11a is wedge block threaded locking hole 1182a with inner threads.

In the disclosure, the wedge block mounting holes 118a are intersected with the face milling insert retaining slots 111a, and after the locking wedge blocks 3a are mounted and locked, a part of the locking wedge blocks 3a are partially exposed in the face milling insert retaining slots 111a.

In the disclosure, axes of the wedge block mounting holes 118a and the first positioning side surface 115a form a second preset angle.

In the disclosure, the second preset angle also represents the included angle of the axes of the wedge block mounting holes 118a with a wedge block locking surfaces 32a of the locking wedge blocks.

In one preferable embodiment of the disclosure, the second preset angle is (+8°, +12°), preferably 10°.

Applicant finds that when the second preset angle is (+8°, +12°) and the locking wedge block 3a is moved towards the interior of the milling insert holder 11a in the axial direction of the locking wedge block 3a, pressure perpendicular to the rake face is exerted to the face milling cutter in the face milling insert retaining slots 111a by the locking wedge block 3a, and then a function of fastening the face milling cutter is achieved. In another preferable embodiment of the disclosure, the second preset angle may also represent an included angle between the axis of the locking wedge block 3a and the wedge block locking surface 32a of the locking wedge block.

The inventor also finds that after the face milling cutter is clamped on the milling insert support bases 113a through the locking wedge block 3a, an angle of 0 degree is formed between an insert bottom edge and the surface of the member to be processed, then cutting or polishing is carried out conveniently, when polishing is carried out, the polishing cutting edge of the wiper insert is clung to the surface of the member to be processed, that is, the included angle between the wiper edge and the surface of the member to be processed is 0 degree; when cutting is carried out, an angle greater than 0 degree is formed between the cutting edge of the cutting insert and the surface of the member to be processed, that is, the included angle between the cutting edge and the surface of the member to be processed is 0-3°.

Figure 14:
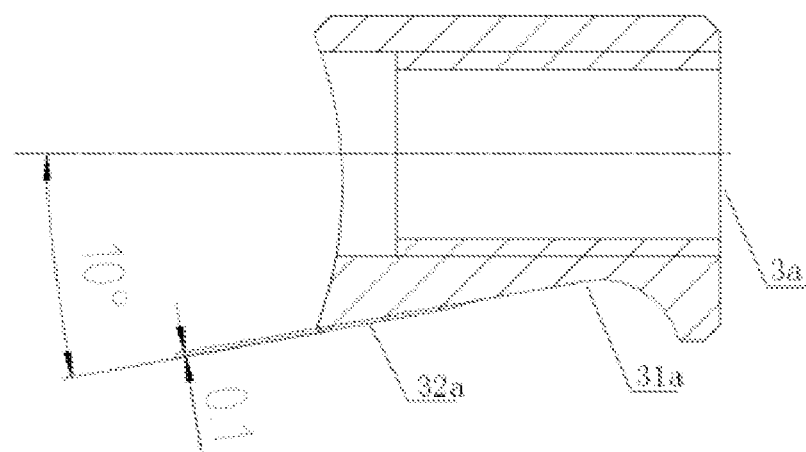
FIG. 14 shows a profile map of a locking wedge block of one embodiment.

In the disclosure, as shown in FIG. 14, the locking wedge block 3a is an eccentric cylinder, and an avoiding slot 31a and the wedge block locking surface 32a which are connected are provided on an outer wall of the locking wedge block 3a in the axial direction of the locking wedge block 3a; the avoiding slot 31a is an arc-shaped surface, the wedge block locking surface 32a and the arc-shaped surface of the avoiding slot 31a are not in a tangent relationship, instead a tail end of the avoiding slot 31a convexes to form the wedge block locking surface 32a, and a locking distance between a tangent line of the arc-shaped surface and the wedge block locking surface 32a is 0.1 mm, so that the cutter tip is prevented from contacting the wedge lock to cause cutter tip damage. Preferably, inner threads are formed in the locking wedge block 3a, more preferably, an outer end surface of the locking wedge block 3a is in smooth transition with the outer wall of the cutter head main body 1a after mounting.

The inventor finds that when the locking wedge block 3a is the eccentric cylinder, the locking wedge block 3a may be prevented from rotating around the axis of the locking wedge block 3a in axial telescopic movement, that is, telescopic failure of the locking wedge block 3a is avoided.

In the disclosure, the locking wedge block 3a is mounted in the wedge block mounting holes 118a through a connecting portion, preferably, the connecting portion is a double-end screw rod, one end of the connecting portion is mounted in the wedge block threaded locking holes 1182a, and the other end is mounted in a threaded hole of the locking wedge block 3a.

In the disclosure, threads in both ends of the double-end screw rod are in opposite rotation directions.

The inventor finds that when the threads in both ends of the double-end screw rod are in opposite rotation directions, and when the double-end screw rod is fed into the milling insert holder 11a, the locking wedge block 3a is driven to screw into the milling insert holder 11a; when the double-end screw rod is screwed outside the milling insert holder 11a, the locking wedge block 3a is driven to screw outside the milling insert holder 11a, that is, "feeding and discharge together" of the double-end screw rod and the locking wedge block 3a is achieved, and the locking wedge block 3a is mounted and adjusted conveniently.

In the disclosure, at lower parts of the milling insert support bases 113a, adjusting block mounting holes 119a are formed inwards from the outer wall of the milling insert holder 11a in a radial direction of the milling insert holder 11a, the adjusting block mounting holes 119a are step holes, holes close to the outer wall of the milling insert holder 11a are adjusting block telescopic adjusting holes 1191a and are matched with an adjusting block 2a, the apertures of the adjusting block mounting holes 119a are slightly greater than the adjusting block 2a, and holes close to the milling insert holder 11a are adjusting block threaded locking holes 1192a with inner threads.

In the disclosure, the adjusting block telescopic adjusting holes 1191a include guide track holes 11911 and adjusting platform holes 11912 which are communicated with each other, and the adjusting platform holes 11912 are communicated with bottom ends of the face milling insert retaining slots 111a.

Figure 12:
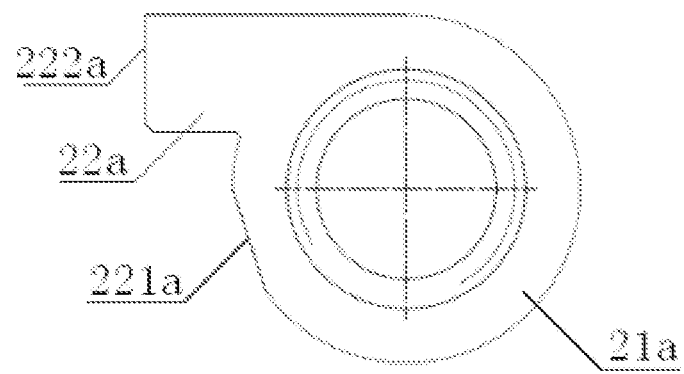
FIG. 12 shows a top view of an adjusting block of one embodiment.
Figure 13:
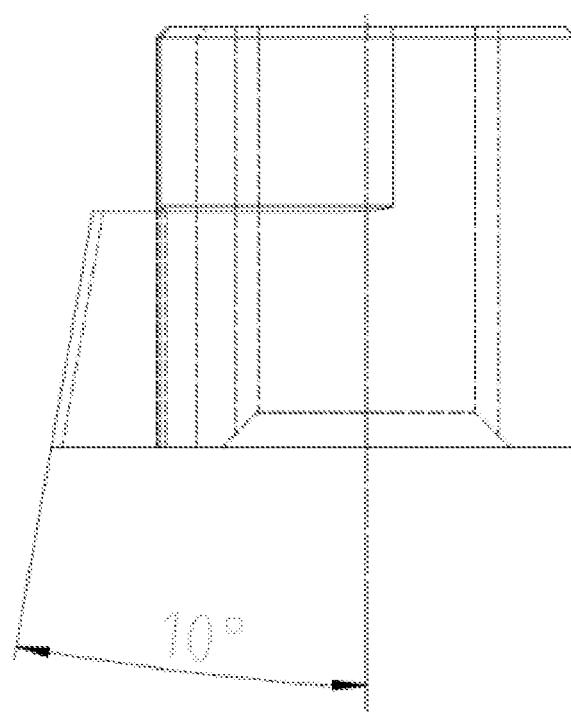
FIG. 13 shows a front view of the adjusting block of one embodiment.

In the disclosure, as shown in FIG. 12, the adjusting block 2a includes a guide track portion 21a and an adjusting platform 22a, optionally, the guide track portion 21a and the adjusting platform 22a are integrally formed, the guide track portion 21a is a column, a prismoid, etc., inner threaded holes are formed in the center of the guide track portion 21a in an axial direction of the guide track portion 21a, the adjusting platform 22a is a column of which a side surface is a plane, optionally, a length of the adjusting platform 22a is smaller than a length of the guide track portion 21a, an adjusting surface 222a is an upper plane of the adjusting platform 22a, and after the adjusting block 2a is mounted in the adjusting block mounting holes 119a, the adjusting surface 222a and the pre-positioning surface 114a are in parallel or on a same plane, so as to support and adjust the face milling cutter.

In the disclosure, a third preset angle is formed between the pre-positioning surface 114a and an axes of the adjusting block mounting holes 119a, and the third preset angle is (+8°, +12°), more preferably 10°.

The inventor finds that when the third preset angle is (+8°, +12°), and when the adjusting block 2a makes telescopic movement inside, a height of the adjusting block 2a in the axial direction of the milling insert holder 11a is somehow changed, then a function of adjusting heights of the face milling cutter is achieved, that is, heights of all face milling cutter on a head surface are highly precisely adjusted.

In one preferable embodiment of the disclosure, the third preset angle may be formed by intersecting the adjusting surface 222a with a shaft hole axis of the adjusting block 2a.

In another preferable embodiment of the disclosure, the third preset angle may also represent an included angle between an adjusting block shaft hole and an adjusting block locking positioning surface of the adjusting block. In the disclosure, an adjusting block locking positioning surface 221a matched with a locking element is provided on the outer wall of the guide track portion 21a in the axial direction of the guide track portion 21a, and the adjusting block 2a is locked after being adjusted to an appropriate position, and thus precision stability of the face milling cutter in the use process is ensured.

In the disclosure, the adjusting block 2a is mounted in the adjusting block mounting holes 119a through a connecting portion, optionally, the connecting portion is the double-end screw rod, one end of the connecting portion is mounted in the adjusting block threaded locking hole 1192a, and the other end is mounted in a threaded hole of the adjusting block 2a.

In the disclosure, threads in both ends of the double-end screw rod for mounting the adjusting block 2a are in opposite rotation directions.

The inventor finds that when the threads in both ends of the double-end screw rod are in opposite rotation directions, and when the double-end screw rod is fed into the milling insert holder 11a, the adjusting block 2a is driven to screw into the milling insert holder 11a; when the double-end screw rod is screwed outside the milling insert holder 11a, the adjusting block 2a is driven to screw outside the milling insert holder 11a, that is, "feeding and discharge together" of the double-end screw rod and the adjusting block 2a is achieved, and the adjusting block 2a is mounted and adjusted conveniently.

In the disclosure, in the milling insert support bases 113a, locking holes 23a are formed inwards from a working end surface of the milling insert holder 11a in a direction perpendicular to an axes of the adjusting block mounting holes 119a.

In the disclosure, the locking holes 23a are threaded holes and are communicated with the adjusting block mounting holes 119a.

In the disclosure, the locking element is arranged in the locking holes 23a, and the locking element is preferably a jack screw.

In the disclosure, when the locking element penetrates through the locking holes 23a and is just propped against the adjusting block locking positioning surface 221a of the adjusting block 2a, the adjusting block 2a is locked after being adjusted to the appropriate position, then the position of the adjusting block 2a is fixed, and furthermore precision stability of the face milling cutter in the processing process is ensured.

In the disclosure, a coolant spraying plate 4a is also fixedly arranged in the center of the face milling cutter, for spraying a coolant in the milling process, and thus a temperature of a working surface is reduced in milling processing.

In the disclosure, the indexable face milling cutting insert described in above embodiments of the disclosure has rotation directions and rotation angles matched with rotation angles of the face milling insert retaining slots in the face milling cutter, different cutting functions are achieved, and thus the face milling cutter is applicable to the slots.

The indexable face milling cutting insert provided by the disclosure has the beneficial effects as follows:

(1) The indexable face milling cutting insert of the disclosure is approximately prismoid-shaped, is capable of carrying out low-resistance cutting and has a wide processing range;

(2) The indexable face milling cutting insert is easy to mount, and two different functions of cutting and polishing are easily achieved through different rotation directions of the rake face;

(3) Each of the multiple flank faces is arranged between the positioning side surface and the rake face of the indexable face milling cutting insert, so that the positioning side surface is not damaged when the cutting edge is polished, and the stable and long-term positioning reference is ensured;

(4) The indexable face milling cutting insert may be repeatedly repaired and polished, and thus the economy of the insert is improved;

(5) The cutter tip of the indexable face milling cutting insert is applicable to different milling purposes;

(6) By adopting the face milling cutting head, quantities and positions of the face cutting milling and the wiper face milling are flexibly set on the cutter head with same insert retaining slots according to needs;

(7) Due to the pre-positioning surface on the face milling cutter head, the insert is rapidly positioned with high positioning precision which is up to 0.01 mm, and the insert may be directly sued without pre-adjustment;

(8) Heights of the adjusting block in the face milling cutter head are conveniently adjusted, heights of the face milling cutter are rapidly and accurately adjusted, and the precision of the whole face milling cutter is within 0.005 mm;

(9) The bottom surfaces of the face milling insert retaining slots in the face milling cutter head and the working surface of the face milling cutter head form preset angles, face milling cutter in different rotation directions have two functions of cutting and polishing after being clamped in the face milling insert retaining slots, and thus the face milling cutter head is applicable to face milling cutter with different functions;

(10) The face milling insert retaining slots in the face milling cutter head are applicable to face milling cutter with different functions because of different rotation directions, that is, positions and quantities of the face cutting millings and the wiper face millings are flexibly set on the face milling cutter head according to needs;

(11) As the face milling cutter is fixed through the wedge block and the fastening part, the precision stability of the face milling cutter in the use process is improved.

The disclosure is specifically described with specific embodiments and exemplary embodiments, and the description is not used to limit the scope of the present disclosure. Those of ordinary skilled in the art can understand that any modifications, equivalent replacements, improvements and the like made within the spirit and principle of the disclosure shall fall within the scope of protection of the disclosure. It is intended that the scope of the present application only be limited by the appended claims.

What is claimed is:

1. A face milling cutting head, comprising a indexable face milling cutting insert and a face milling cutter head for clamping the indexable face milling cutting insert, the indexable face milling cutting insert which comprises an insert body (1) and a cutting body (2) arranged on an upper surface of the insert body (1), wherein the indexable face milling cutting insert is prismoid-shaped; the insert body (1) and the cutting body (2) are in smooth transition; the insert body (1) comprises multiple positioning side surfaces (11), an upper plane (12), and a positioning bottom surface (13); the cutting body (2) is arranged on the upper plane (12) of the insert body (1); an area of the upper plane (12) is larger than an area of the positioning bottom surface (13); a projection ($1_2$) of an edge of the positioning bottom surface (13), or an extension line thereof, on a rake face (21) is intersected with a corresponding edge of the rake face (21), or an extension line ($1_3$) thereof, to form a surface deflection angle (23), the upper plane (12) of the indexable face milling cutting insert is rotated clockwise relative to the positioning bottom surface (13) around a central shaft ($1_1$) of the indexable face milling cutting insert, the upper plane (12) of the indexable face milling cutting insert is rotated counter-clockwise relative to the positioning bottom surface (13) around the central shaft ($1_1$) of the indexable face milling cutting insert, multiple face milling insert retaining slots (111a) are formed in the face milling cutter head, a shape of each of the multiple face milling insert retaining slots (111a) is matched with a shape of the indexable face milling cutting insert, and each of the multiple face milling insert retaining slots (111a) comprises a pre-positioning surface (114a), a first positioning side surface (115a) and a second positioning side surface (116a), the face milling cutter head comprises a horn-shaped cutter head main body (1a) and an adjusting block (2a) and a locking wedge block (3a), the adjusting block (2a) and the locking wedge block (3a) are provided on the cutter head main body (1a), wherein the cutter head main body (1a) comprises a milling insert holder (11a) and a cutter stem connecting portion (12a) and a transition portion (13a), the transition portion (13a) is arranged between the milling insert holder (11a) and the cutter stem connecting portion (12a), wherein the milling insert holder (11a) is circular cylinder shaped or hollow truncated cone shaped, the multiple face milling insert retaining slots (111a) and multiple wedge block mounting scrap discharge slots (112a) which are communicated with adjacent face milling insert retaining slots (111a) are formed in a working end surface of the milling insert holder (11a), and multiple milling insert support bases (113a) are formed on a working end surface of the milling insert holder (11a);

a first preset angle is formed by the second positioning side surface (116a) and a plane of an end surface of the milling insert holder (11a), the first positioning side surface (115a) and the end surface of the milling insert holder (11a) form a radial front angle (1151a), and the first positioning side surface (115a) and an axis of the milling insert holder (11a) form an axial front angle (1152a);

wedge block mounting holes (118a) are formed in the wedge block mounting scrap discharge slots (112a) in a radial direction of the milling insert holder (11a), and axes of each of the wedge block mounting holes (118a) and the first positioning side surface (115a) form a second preset angle.

2. The face milling cutting head as claimed in claim 1, wherein each of the multiple face milling insert retaining slots (111a) is inclined towards an interior of the milling insert holder (11a).

3. The face milling cutting head as claimed in claim 1, wherein the first preset angle is greater than 87° and less than 90°.

4. The face milling cutting head as claimed in claim 3, wherein the first preset angle is 89°.

5. The face milling cutting head as claimed in claim 1, wherein the second preset angle is greater than 8° and less than 12°.

6. The face milling cutting head as claimed in claim 5, wherein the second preset angle is 10°.

7. The face milling cutting head as claimed in claim 1, wherein adjusting block mounting holes (119a) are formed inwards from an outer wall of the milling insert holder (11a) above the multiple face milling insert retaining slots (111a) in a radial direction of the milling insert holder (11a);

on the multiple milling insert support bases (113a), locking holes (23a) are formed inwards from a working end surface of the milling insert holder (11a) in a direction perpendicular to an axes of the adjusting block mounting holes (119a).

8. The face milling cutting head as claimed in claim 1, wherein adjusting block mounting holes (119a) are formed inwards from an outer wall of the milling insert holder (11a) above the multiple face milling insert retaining slots (111a) in a radial direction of the milling insert holder (11a);

an axes of the adjusting block mounting holes (119a) and the pre-positioning surface (114a) form a third preset angle, and the third preset angle is greater than 8° and less than 12°.

9. The face milling cutting head as claimed in claim 8, wherein the third preset angle is 10°.

10. The face milling cutting head as claimed in claim 1, wherein the adjusting block (2a) comprises a guide track portion (21a) and an adjusting platform (22a), an adjusting block locking positioning surface (221a) matched with a locking element is provided on an outer wall of the guide track portion (21a) in an axial direction of the guide track portion (21a).

11. The face milling cutting head as claimed in claim 1, wherein the locking wedge block (3a) is an eccentric cylinder, and an avoiding slot (31a) is formed in an outer wall of the locking wedge block (3a).

12. The face milling cutting head as claimed in claim 1, wherein the surface deflection angle (23) is greater than −3° and less than +3°.

13. The face milling cutting head as claimed in claim 12, wherein the surface deflection angle (23) is greater than −1° and less than +1°.

14. The face milling cutting head as claimed in claim 1, wherein a face of the cutting body (2) contacting with a member to be processed is the rake face (21), each of ridges (212) of the rake face (21) is provided with a cutting edge (212a), the cutting edge (212a) is arc-shaped, a radius of the arc-shaped is a radius of a cutter tip, and the radius of the cutter tip is 0-1.8 mm.

15. The face milling cutting head as claimed in claim 1, wherein the cutting body (2) covers the upper plane (12) of the insert body (1), and is polygon-shaped corresponding to the insert body (1); or the cutting body (2) is arranged along an edge of the insert body (1), and is strip-shaped; or the cutting body (2) is arranged at a cutter tip, and is triangle-shaped or parallelogram-shaped.

16. The face milling cutting head as claimed in claim 1, wherein multiple flank faces (3) are arranged between the rake face (21) and the multiple positioning side surfaces (11);

each of the multiple flank faces (3) is intersected with the rake face (21), so as to form a preset angle, and the preset angle is greater than an included angle formed by each of the multiple positioning side surfaces (11) and the rake face (21).

* * * * *